(12) United States Patent
Zaldivar

(10) Patent No.: US 11,317,647 B2
(45) Date of Patent: May 3, 2022

(54) COCONUT WATER REMOVAL DEVICE AND METHOD THEREFOR

(71) Applicant: Vincent Zaldivar, Las Vegas, NV (US)

(72) Inventor: Vincent Zaldivar, Las Vegas, NV (US)

(73) Assignee: MONARCH MEDIA, LLC, Las Vegas, NV (US)

( * ) Notice: Subject to any disclaimer, the term of this patent is extended or adjusted under 35 U.S.C. 154(b) by 152 days.

(21) Appl. No.: 16/680,218

(22) Filed: Nov. 11, 2019

(65) Prior Publication Data

US 2020/0077693 A1 Mar. 12, 2020

Related U.S. Application Data

(63) Continuation-in-part of application No. 14/557,783, filed on Dec. 2, 2014, now Pat. No. 10,609,939.

(51) Int. Cl.
*A23N 1/02* (2006.01)
*A23N 5/03* (2006.01)

(52) U.S. Cl.
CPC ........... *A23N 1/02* (2013.01); *A23N 5/03* (2013.01)

(58) Field of Classification Search
CPC .................................. A23N 1/02; A23N 5/03
USPC ......... 99/506, 538, 574, 576, 590, 593, 594; 222/80, 81, 82, 83, 83.5, 85, 86, 87, 88, 222/89, 90, 91
See application file for complete search history.

(56) References Cited

U.S. PATENT DOCUMENTS

| | | | | |
|---|---|---|---|---|
| 1,365,397 A | * | 1/1921 | Gormley | A23N 5/03 99/595 |
| 1,374,899 A | * | 4/1921 | Baker, Jr. | A23N 5/03 426/482 |
| 1,413,386 A | * | 4/1922 | Rohr | A23N 5/03 99/576 |
| 1,506,571 A | * | 8/1924 | Deremberg | A23N 5/03 99/495 |
| 1,554,516 A | * | 9/1925 | Olds, Jr. | A23N 5/03 426/481 |
| 1,554,571 A | * | 9/1925 | Gentel | A23N 5/03 99/579 |
| 1,626,361 A | * | 4/1927 | Schmitt | A23N 5/03 426/482 |
| 1,645,600 A | * | 10/1927 | Kohler | A23N 5/03 99/576 |
| 2,365,358 A | * | 12/1944 | Rector | A23N 5/03 99/538 |
| 2,552,155 A | * | 5/1951 | Danielson | B67B 7/26 222/81 |
| 2,779,361 A | * | 1/1957 | Mckiff | B23B 51/0473 408/204 |
| 2,782,825 A | * | 2/1957 | Rey | A23N 5/03 99/538 |
| 2,794,469 A | * | 6/1957 | Shortell | B23B 51/0426 408/206 |
| 2,990,615 A | * | 7/1961 | Ohler | A47J 25/00 30/316 |

(Continued)

*Primary Examiner* — Jimmy Chou
(74) *Attorney, Agent, or Firm* — Weiss & Moy, P.C.; Jeffrey D. Moy

(57) ABSTRACT

A device from draining coconut water from a coconut has a handle. A tubular member extends down from the handle. A plurality of teeth extends down from a distal end of the tubular member. An end cap member is positioned over the distal end of the tubular member.

11 Claims, 7 Drawing Sheets

(56) References Cited

U.S. PATENT DOCUMENTS

| | | | | |
|---|---|---|---|---|
| 3,162,067 A * | 12/1964 | Koons | B23B 29/326 | 408/206 |
| 3,191,651 A * | 6/1965 | Sindel | A23N 5/03 | 426/481 |
| 3,262,474 A * | 7/1966 | Enders | B23B 51/0473 | 408/209 |
| 3,372,839 A * | 3/1968 | Hayes | B65D 83/70 | 222/94 |
| 3,390,596 A * | 7/1968 | Trevathan | B23B 51/04 | 408/68 |
| 3,580,423 A * | 5/1971 | Gilman | B65D 51/20 | 222/81 |
| 3,609,056 A * | 9/1971 | Hougen | B23B 51/0426 | 408/204 |
| 3,648,508 A * | 3/1972 | Hougen | B23B 51/0473 | 72/325 |
| 3,768,698 A * | 10/1973 | Corty, Sr. | B67B 7/26 | 222/91 |
| 3,880,546 A * | 4/1975 | Segal | B23B 31/113 | 408/204 |
| 3,964,640 A * | 6/1976 | Laughlin | B67B 7/26 | 222/81 |
| 4,077,737 A * | 3/1978 | Morse | B23B 51/0426 | 144/23 |
| 4,271,982 A * | 6/1981 | Niksich | B65D 47/248 | 222/501 |
| 4,303,357 A * | 12/1981 | Makar | B23B 31/113 | 279/145 |
| 4,310,969 A * | 1/1982 | Cannizzaro | A47J 25/00 | 30/113.1 |
| 4,350,088 A * | 9/1982 | Rubio, Jr. | A23N 5/03 | 99/538 |
| 4,358,467 A * | 11/1982 | Patel | A23L 25/20 | 219/121.6 |
| 4,441,410 A * | 4/1984 | Thompson | A47J 43/255 | 241/273.3 |
| 4,446,989 A * | 5/1984 | Brannen | B67B 7/26 | 222/108 |
| 4,503,757 A * | 3/1985 | Daugherty | A47J 31/4403 | 392/447 |
| 4,574,181 A * | 3/1986 | Spector | F23Q 7/00 | 392/390 |
| 4,708,056 A * | 11/1987 | Dinanath | A23N 5/03 | 426/482 |
| 4,741,651 A * | 5/1988 | Despres | B23B 51/0453 | 125/20 |
| 4,858,760 A * | 8/1989 | Di Sturco | B65D 51/285 | 206/222 |
| 4,881,662 A * | 11/1989 | Tallman | B67B 7/26 | 222/81 |
| 5,005,336 A * | 4/1991 | Bloom | B65D 13/00 | 206/457 |
| 5,056,223 A * | 10/1991 | Buck | A47J 25/00 | 30/113.1 |
| 5,174,469 A * | 12/1992 | Policapelli | B65D 1/165 | 220/710 |
| D335,615 S * | 5/1993 | Kannukkaden | D7/678 | |
| 5,249,708 A * | 10/1993 | Magness | B67B 7/26 | 222/80 |
| 5,463,943 A * | 11/1995 | Knasel | A23N 4/20 | 99/542 |
| 5,482,176 A * | 1/1996 | Maietta | B65D 77/067 | 220/277 |
| 5,543,097 A * | 8/1996 | Fang | B01F 15/0205 | 204/467 |
| 5,564,622 A * | 10/1996 | Wald | B67B 7/26 | 229/125.04 |
| 5,690,452 A * | 11/1997 | Baublits | B23B 51/0473 | 408/204 |
| D392,297 S * | 3/1998 | Brutscher | D15/139 | |
| 5,803,677 A * | 9/1998 | Brutscher | B23B 51/0426 | 408/204 |
| 5,813,802 A * | 9/1998 | Ajimi | B23B 51/0426 | 175/403 |
| 5,855,298 A * | 1/1999 | Teetsel, III | B67B 7/26 | 222/81 |
| 5,864,939 A * | 2/1999 | In-Seok | B67B 7/0441 | 29/509 |
| 5,934,845 A * | 8/1999 | Frey | B23B 51/044 | 408/68 |
| 5,960,992 A * | 10/1999 | Bernstein | B65D 5/748 | 222/541.2 |
| 5,975,814 A * | 11/1999 | Pomp | B27G 15/00 | 408/213 |
| 6,032,368 A * | 3/2000 | Huang | A47J 25/00 | 30/113.1 |
| 6,045,302 A * | 4/2000 | Orr | B23B 51/0426 | 408/200 |
| 6,175,687 B1 * | 1/2001 | Imamura | F24F 6/043 | 392/395 |
| D438,219 S * | 2/2001 | Brutscher | D15/139 | |
| 6,223,924 B1 * | 5/2001 | Ek | B65D 5/748 | 215/230 |
| 6,234,167 B1 * | 5/2001 | Cox | A61M 15/0083 | 128/200.14 |
| 6,279,779 B1 * | 8/2001 | Laciacera | B65D 5/748 | 222/541.2 |
| 6,364,164 B1 * | 4/2002 | Troiano | B65D 5/748 | 222/83 |
| 6,375,051 B1 * | 4/2002 | Iverson | B65D 39/08 | 222/552 |
| 6,378,730 B1 * | 4/2002 | Reddy | B67B 7/26 | 222/541.9 |
| 6,398,075 B1 * | 6/2002 | Laciacera | B65D 5/748 | 222/83 |
| 6,598,757 B2 * | 7/2003 | Stillinger | B65D 5/746 | 215/387 |
| 6,599,063 B1 * | 7/2003 | Capstran | B23B 51/0426 | 408/1 R |
| 6,651,845 B1 * | 11/2003 | Schroeder | B67B 7/28 | 222/105 |
| 6,705,807 B1 * | 3/2004 | Rudolph | B23B 51/0426 | 279/143 |
| 6,722,269 B1 * | 4/2004 | Kumar | A23N 5/03 | 99/538 |
| 6,851,576 B2 * | 2/2005 | Dubach | B65D 5/748 | 220/277 |
| 6,971,548 B2 * | 12/2005 | Smith | B67D 1/0078 | 222/83 |
| 7,196,291 B2 * | 3/2007 | Cothran | F24C 7/06 | 219/393 |
| 7,261,226 B2 * | 8/2007 | Adams | B65D 47/244 | 206/221 |
| D551,269 S * | 9/2007 | Burke, III | D15/139 | |
| D575,808 S * | 8/2008 | Zeiler | D15/139 | |
| 7,458,486 B2 * | 12/2008 | Weist | B65D 5/748 | 222/83 |
| 7,556,459 B2 * | 7/2009 | Rompel | B23B 51/0426 | 408/204 |
| 7,625,160 B2 * | 12/2009 | Zeiler | B23B 51/0413 | 408/1 R |
| 7,934,893 B2 * | 5/2011 | Gillissen | B23B 51/0473 | 408/68 |
| 7,980,424 B2 * | 7/2011 | Johnson | B67B 7/26 | 222/83 |
| 8,038,371 B2 * | 10/2011 | Miller | B23B 51/0473 | 408/204 |
| 8,038,372 B2 * | 10/2011 | Miller | B23B 51/0473 | 408/204 |
| 8,221,037 B2 * | 7/2012 | Neitzell | B27B 5/12 | 408/204 |
| D669,324 S * | 10/2012 | Bodum | D7/693 | |
| 8,276,507 B1 * | 10/2012 | Walker | A47J 27/08 | 99/337 |
| 8,328,474 B2 * | 12/2012 | Pangerc | B23B 51/0473 | 408/204 |
| 8,459,478 B2 * | 6/2013 | Alther | B65D 5/748 | 215/297 |

(56) References Cited

U.S. PATENT DOCUMENTS

| | | | | |
|---|---|---|---|---|
| 8,590,753 B2* | 11/2013 | Marina | B67D 3/0019 | 222/325 |
| 8,622,853 B1* | 1/2014 | Roland | A63B 57/10 | 473/398 |
| 8,627,975 B1* | 1/2014 | Whitbeck | B65D 39/00 | 220/254.1 |
| 8,684,641 B2* | 4/2014 | Moffatt | B23B 51/0473 | 408/204 |
| 8,709,519 B1* | 4/2014 | dePoo | A23N 5/08 | 426/489 |
| 8,827,603 B2* | 9/2014 | Eck | B23B 51/0426 | 408/80 |
| 9,022,703 B2* | 5/2015 | Keightley | B23B 51/0473 | 408/204 |
| 9,049,885 B2* | 6/2015 | dePoo | A23L 19/03 | |
| D748,700 S* | 2/2016 | Velozny | D15/139 | |
| 9,919,850 B2* | 3/2018 | Bons | B65D 75/5877 | |
| 10,086,980 B2* | 10/2018 | Isogai | B65D 47/123 | |
| 2002/0106254 A1* | 8/2002 | Rudolph | B23B 51/0426 | 408/204 |
| 2002/0141838 A1* | 10/2002 | Thomas | B27G 15/00 | 408/214 |
| 2004/0112893 A1* | 6/2004 | Okuda | H05B 3/48 | 219/544 |
| 2004/0129696 A1* | 7/2004 | Doi | G03G 15/2053 | 219/619 |
| 2004/0178220 A1* | 9/2004 | Smith | B67D 1/0078 | 222/83 |
| 2005/0011909 A1* | 1/2005 | Hanell | B67B 7/26 | 222/83 |
| 2005/0236425 A1* | 10/2005 | Casale | B65D 5/748 | 222/83.5 |
| 2005/0242113 A1* | 11/2005 | Weist | B65D 5/748 | 222/83.5 |
| 2005/0276669 A1* | 12/2005 | Pottorff | B26F 1/16 | 408/97 |
| 2006/0249533 A1* | 11/2006 | Verespej | B65D 51/20 | 222/81 |
| 2007/0104547 A1* | 5/2007 | Russell | F16L 41/06 | 408/1 R |
| 2007/0172325 A1* | 7/2007 | Ebert | B27G 15/00 | 408/227 |
| 2008/0029540 A1* | 2/2008 | Johnson | B67B 7/26 | 222/83 |
| 2008/0245683 A1* | 10/2008 | McKenna | B65D 51/2835 | 206/219 |
| 2009/0020558 A1* | 1/2009 | Bolli | B65D 5/748 | 222/83 |
| 2009/0188939 A1* | 7/2009 | McCoy | B67D 3/04 | 222/91 |
| 2009/0250488 A1* | 10/2009 | Dubach | B65D 5/748 | 222/83 |
| 2009/0291172 A1* | 11/2009 | Saez | B65D 85/72 | 426/330.5 |
| 2009/0302037 A1* | 12/2009 | Rigling | B65D 5/748 | 220/258.4 |
| 2010/0018992 A1* | 1/2010 | Dill | B65D 5/747 | 222/83 |
| 2010/0038494 A1* | 2/2010 | Osborn | F16L 3/133 | 248/58 |
| 2010/0067995 A1* | 3/2010 | Keightley | B23B 51/0426 | 408/68 |
| 2010/0075782 A1* | 3/2010 | Stiles | A63B 57/203 | 473/386 |
| 2010/0086372 A1* | 4/2010 | Werner | B23B 51/0453 | 408/1 R |
| 2010/0224629 A1* | 9/2010 | Schroeder | B65D 75/5877 | 222/545 |
| 2010/0247258 A1* | 9/2010 | Keightley | B23B 51/0473 | 408/204 |
| 2010/0264146 A1* | 10/2010 | Casale | B65B 69/00 | 220/278 |
| 2011/0031273 A1* | 2/2011 | Macler | B67B 7/24 | 222/81 |
| 2011/0120320 A1* | 5/2011 | Ukani | A23N 5/03 | 99/576 |
| 2011/0147414 A1* | 6/2011 | Chen | B65D 51/285 | 222/83 |
| 2011/0255931 A1* | 10/2011 | Murdie | B23B 51/0473 | 408/204 |
| 2012/0012609 A1* | 1/2012 | Ognissanti | A47G 19/03 | 221/290 |
| 2012/0138634 A1* | 6/2012 | Benko | B65D 85/72 | 222/83 |
| 2012/0272831 A1* | 11/2012 | Barberio | B01F 3/0446 | 99/323.1 |
| 2012/0288602 A1* | 11/2012 | Diatlo | A23L 2/04 | 426/489 |
| 2013/0055898 A1* | 3/2013 | Yano | F21S 45/30 | 96/4 |
| 2013/0168412 A1* | 7/2013 | Barron | B65D 51/221 | 222/83 |
| 2013/0233885 A1* | 9/2013 | Cohen | B67B 7/26 | 222/91 |
| 2013/0256336 A1* | 10/2013 | Himmelsbach | B65D 5/748 | 222/81 |
| 2014/0044848 A1* | 2/2014 | dePoo | B65D 25/48 | 426/489 |
| 2014/0048557 A1* | 2/2014 | Barron | B65D 5/748 | 222/81 |
| 2014/0144937 A1* | 5/2014 | Arsena-Armstrong | B67B 7/26 | 222/89 |
| 2014/0197199 A1* | 7/2014 | Barron | B65D 75/5877 | 222/83 |
| 2014/0322413 A1* | 10/2014 | Boccacci | A23L 2/04 | 426/489 |
| 2015/0048110 A1* | 2/2015 | dePoo | A23L 2/04 | 222/567 |
| 2015/0068406 A1* | 3/2015 | Marsden | B01F 3/04744 | 99/323.1 |
| 2015/0175323 A1* | 6/2015 | Barron | B65D 51/002 | 222/81 |
| 2015/0230651 A1* | 8/2015 | Molayem | A47J 31/0636 | 99/322 |
| 2015/0374025 A1* | 12/2015 | Evans | B30B 9/20 | 99/495 |
| 2015/0375911 A1* | 12/2015 | Stirn | B65D 39/08 | 222/81 |
| 2016/0178411 A1* | 6/2016 | Sedory | E01B 9/10 | 324/207.15 |
| 2016/0200491 A1* | 7/2016 | Dubach | B65D 51/222 | 222/83 |
| 2017/0209003 A1* | 7/2017 | Quintero | A47J 43/26 | |
| 2018/0044064 A1* | 2/2018 | Clarke | B26F 1/32 | |

* cited by examiner

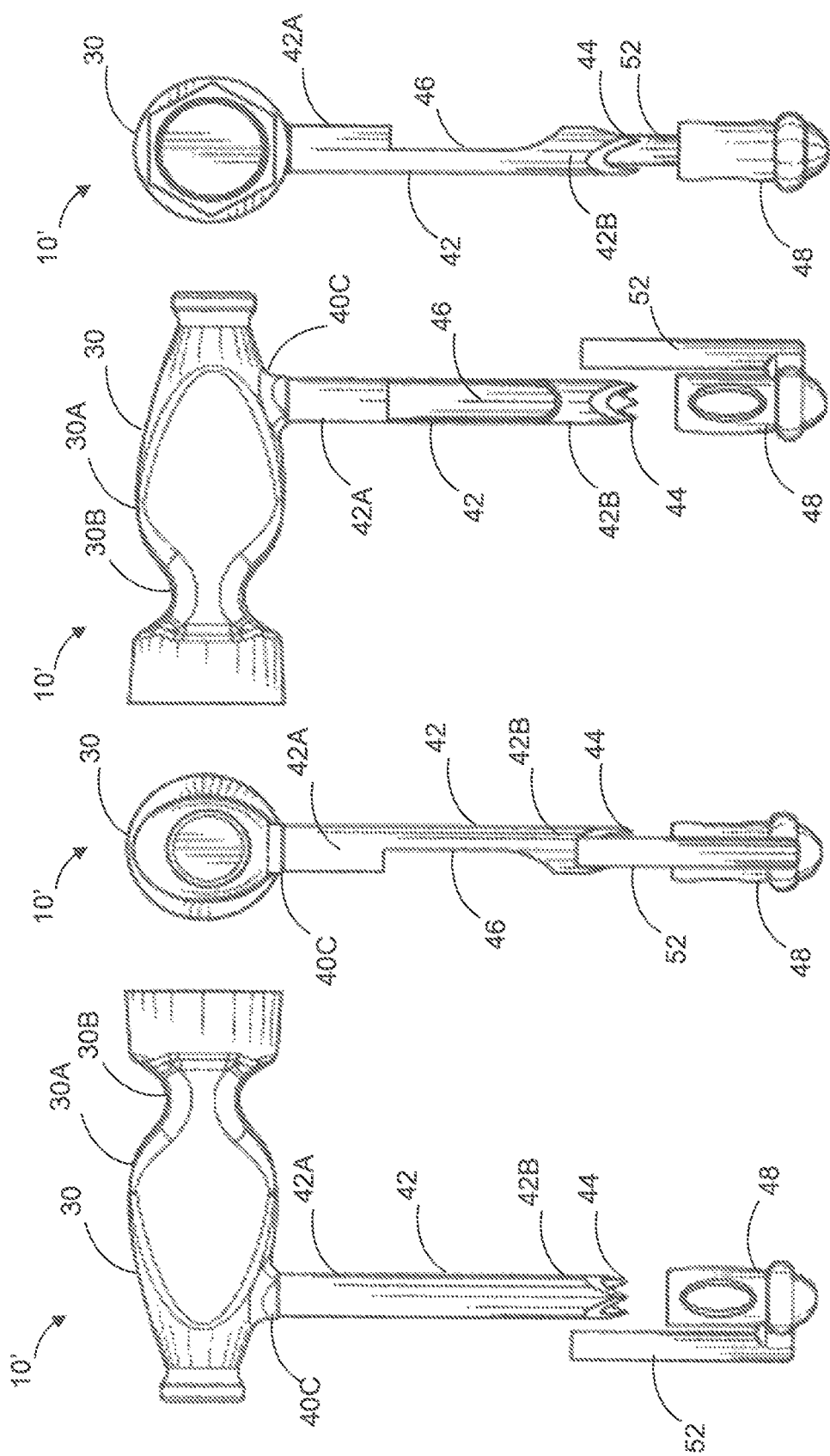

COCONUT WATER REMOVAL DEVICE AND METHOD THEREFOR

This patent application is a continuation-in-part of U.S. application Ser. No. 14/557,783 filed Dec. 2, 2014; that in turn claims priority benefit of U.S. Provisional Application Ser. No. 61/916,361, filed Dec. 16, 2013, entitled "COCONUT WATER REMOVAL DEVICE AND METHOD THEREFOR" in the name of the same inventors, and which is incorporated herein by reference in its entirety.

TECHNICAL FIELD

This disclosure relates generally to a fruit opening system, and more particularly to a system and method to open a coconut to access and drink the coconut water stored within the coconut.

BACKGROUND

Coconut water is a liquid that forms naturally inside the shell of a coconut. It is a common drink in many tropical countries and is becoming more popular in the United States as many companies are marketing it as a natural sports drink. Coconut water has fewer calories, less sodium, and more potassium than most sport drinks. Ounce per ounce, most unflavored coconut water contains 5.45 calories, 1.3 grams sugar, 61 milligrams (mg) of potassium, and 5.45 mg of sodium compared to Gatorade®, which has 6.25 calories, 1.75 grams of sugar, 3.75 mg of potassium, and 13.75 mg of sodium.

Coconut water should net be confused with high-fat coconut milk or oil. Coconut water is a clear liquid in the fruit's center that is tapped from young, green coconuts.

Presently, there is no easy way to remove the coconut water from within the coconut. In general, most people try to find the soft "eye" of the coconut. The soft "eye" is a black spot located at the top of the coconut. Once the soft "eye" of the coconut is located, a person may use a metallic skewer such as a screwdriver to pierce the coconut. Alternatively, a nail and a hammer may be used to create the opening in the soft "eye".

Once the soft "eye" has been pierced, the skewer may be pushed towards the interior of the coconut. The skewer may then be removed and the coconut water may be drained into a bowl or other container.

Unfortunately, the above method is not easy. Further, it does not allow one to easily drain the coconut water. Many times after removing the skewer and trying to drain the coconut water, the coconut water tends to hug the side of the coconut and spill never reaching the bowl.

Therefore, it would be desirable to provide a system and method that overcomes the above.

SUMMARY

This summary is provided to introduce a selection of concepts in a simplified form chat are further described below in the DESCRIPTION OF THE APPLICATION. This summary is not intended to identify key features of the claimed subject matter, nor is it intended to be used as an aid in determining the scope of the claimed subject matter.

In accordance with one aspect of the present application, a device from draining coconut water from a coconut is disclosed. The device has a handle. A tubular member extends down from the handle. A plurality of teeth extends down from a distal end of the tubular member. An end cap member is positioned over the distal end of the tubular member.

In accordance with one aspect of the present application, a device from draining coconut water from a coconut is disclosed. The device has a handle. A tubular member extends down from the handle. A window is formed within the tubular member exposing an interior of the tubular member. A plurality of teeth extends down from a distal end of the tubular member. An end cap member 19 positioned over the distal end of the tubular member.

In accordance with one aspect of the present application, a device from draining coconut water from a coconut is disclosed. The device has a base member having a plurality of flat surfaces formed around an outer perimeter. A tubular member extends downward from a central area of the base member, a distal end of the tubular member cut at an angle to form a pointed edge. A spout extends up from a top section of the base member and in fluid communication with the tubular member.

BRIEF DESCRIPTION OF THE DRAWINGS

Embodiments of the disclosure will become more fully understood from the detailed description and the accompanying drawings, wherein:

FIG. 8 is a first side view of the coconut water removal device of FIG. 7;

FIG. 9 is a back side view of the coconut water removal device of FIG. 7;

FIG. 10 is a second side view of the coconut water removal device of FIG. 7;

FIG. 11 is a front side view of the coconut water removal device of FIG. 7;

DESCRIPTION OF THE DISCLOSURE

Figure 1:
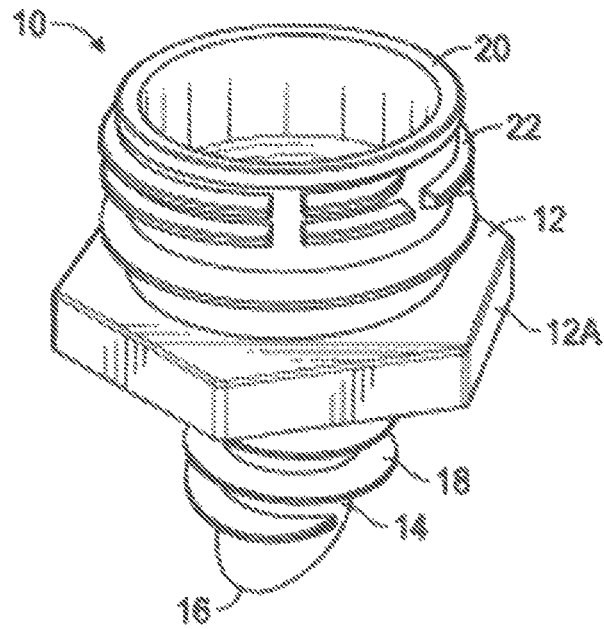
FIG. 1 is a perspective view of the coconut water removal device.

Referring to the FIGS. 1-6, one embodiment of a coconut water removal device 10 (hereinafter device 10) is shown. The device 10 may be inserted into a coconut 26 to drain the coconut water formed inside the coconut 26. The device 10 may be used to convert the coconut 26 into a drinking device with a resealable top that can be opened and closed at will.

The device 10 may have a base member 12. The base member 12 may have a plurality of flat surfaces 12A formed around an outer perimeter of the base member 12. The number of flat surfaces 12A may vary. The flat surfaces 12A may be arranged so that the base member 12 can be configured as a hardware nut.

A tubular member 14 may extend downward from a central area of the base member 12. A distal end 14A of the tubular member 14 may be cut at an angle to form a pointed edge 16. The pointed edge 16 may be configured to allow the device 10 to cut through the outer shell of the coconut and be inserted into the interior of the coconut. The tubular member 14 may have threading 18 formed around an exterior surface thereof. The threading 18 is a helical structure used to convert between rotational and linear movement or force.

A spout 20 may extend up from a top section of the base member 12. The spout 20 may be in fluid communication with the tubular member 14. Thus, a pathway may be formed from the spout 20, through the base member 12 and through the tubular member 14. Thus, the spout 20 may be used to pour out the coconut water from the interior of the coconut once the device 10 is inserted into the coconut. Ribbing 22 may be formed around an outer surface of the spout 20. The ribbing 22 may be used to secure a lid 24 or closure device to the spout 20.

In use, a user of the device 10 may push the pointed edge 16 of the device 10 into the soft "eye" of the coconut. While it is easier to insert the device 10 into the "eye", it may be inserted into other areas of the coconut. A user may then use a wrench or similar tool to rotate the base member 12 thereby causing the threading 18 of the tubular member 14 to rotate into the coconut. The threading 18 can secure the device 10 to the coconut and further prevents leakage of the coconut water from the soft "eye" of the coconut where the device 10 was inserted. Once the device 10 is inserted and tightened, the user may pour the coconut water out via the spout 20 or use the device 10 to drink the coconut water directly from the coconut. The user may place the lid 24 on the device 10 and reseal the coconut if all the coconut water is not drunk.

Referring to FIGS. 7-11, another embodiment of a coconut water removal device 10' (hereinafter device 10') is shown. The device 10' has a handle member 30. The handle 30 may be used to grip the device 10'. In accordance with the embodiment shown in FIGS. 7-11, the handle 30 may have a curved section 30A, An indented area 30B may extend from the curved section 30A. The handle 30 may be configured to allow one to more comfortably grab the handle 30 when using the device 10'

The device may have a tubular member 42. A first end 42A of the tubular member 42 may extend down from a bottom section 40C of the handle 30. A second end 42B of the tubular member 42 may have a jagged configuration. The second end 42B may have a plurality of teeth 44 extending down from the second end 42B. The teeth 44 may be sharp to allow the tubular member 42 to cut and penetrate into a coconut as described below.

The tubular member 42 may have an opening 46 formed therein to expose an interior of the tubular member 42. The opening 46 may have a rounded/curved bottom section. The opening 46 may be used to remove any debris and/or items that may be stuck in the interior of the tubular member.

The device 10' may have an end cap 48. The end cap 48 may be positioned over the second end 42B of the tubular member 42 when the device 10' is not in use. The end cap 48 may be used to protect others from being hurt and/or cut by the second end 42B of the tubular member 42.

In the embodiment shown, the end cap 48 may have a tubular cap member 50. The tubular cap member 50 may be configured to fit snugly over the second end 42B of the tubular member 42. A rod member 52 may be attached to the tubular cap member 50. The rod member 52 may be dimensioned to fit within the tubular member 42.

In operation, the user may grip the device 10' be grabbing the handle 30. The user may grip the handle 30 with a palm of the user's hand pressing against a top section of the handle 30 and the user's fingers wrapped around a bottom section of the handle 30. The user may press the second end 42B of the tubular member 42 into the soft "eye" of the coconut. The device 10' may be inserted into other areas of the coconut without departing from the spirit and scope of the present application.

When the device 10' has reached the interior of the coconut, the user may remove the device 10 from the coconut. A pathway may be formed within the coconut to allow the user to drain the coconut water from the coconut.

When the user removes the device 10', remnants of the coconut may be left within the tubular member 42. The user may insert the rod member 52 into the tubular member 42. Remnants of the coconut left within the tubular member 42 may be pushed out the opening 46 formed in the tubular member 42.

Referring to FIGS. 12-15, another embodiment of a coconut water removal device 60 is shown. The device 60 may be inserted into a coconut 26 to drain the coconut water formed inside the coconut 26. The device 60 may be used to convert the coconut 26 into a drinking device with a resealable top that can be opened and closed at will.

The device 60 may have a base member 12. The base member 12 may have a plurality of flat surfaces 12A formed around an outer perimeter of the base member 12. The number of flat surfaces 12A may vary. The flat surfaces 12A may be arranged so that the base member 12 can be configured as a hardware nut. The flat surfaces 12A may be keyed to orient the device 60 for automated placement with automated manufacturing equipment.

Figure 3:
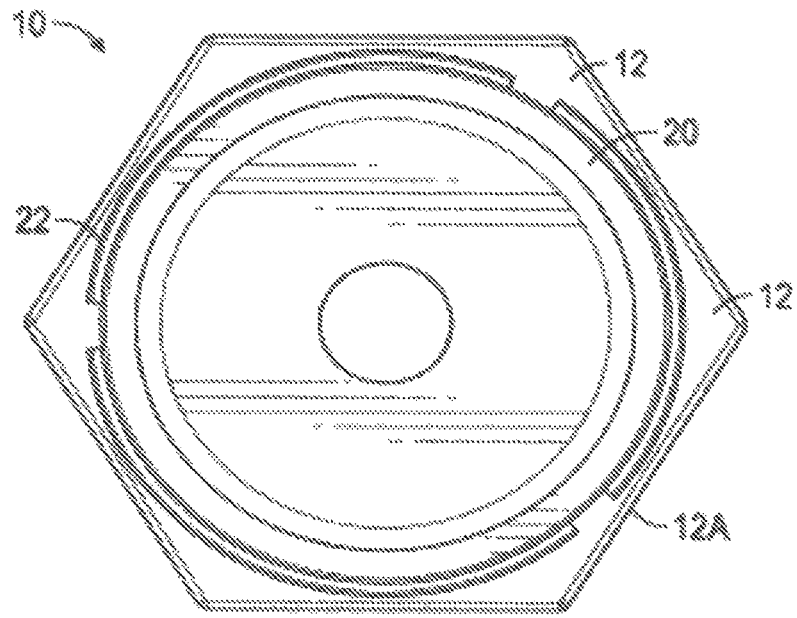
FIG. 3 is a top view of the coconut water removal device.
Figure 4:
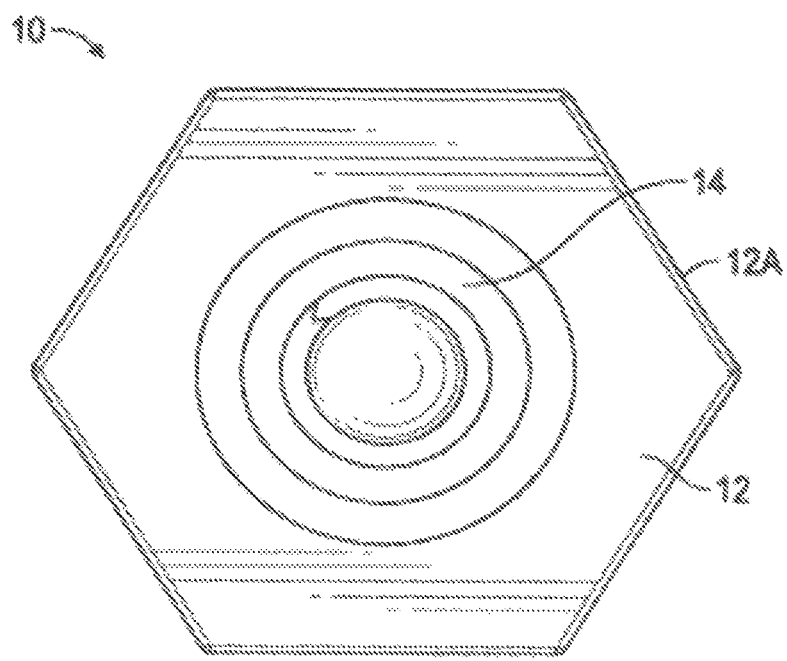
FIG. 4 is a bottom view of the coconut water removal device
Figure 5:
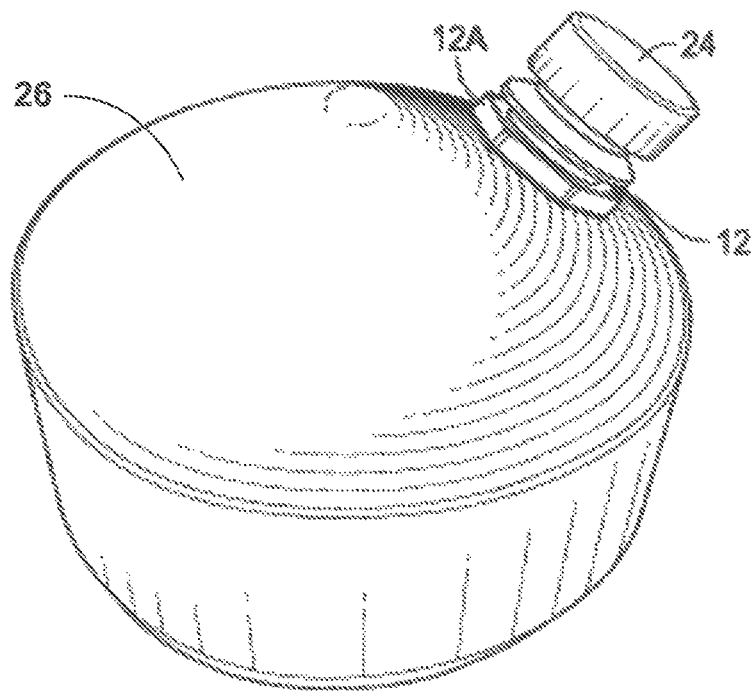
FIG. 5 is a side perspective view of the coconut water removal device with the lid on inserted into a coconut.
Figure 6:
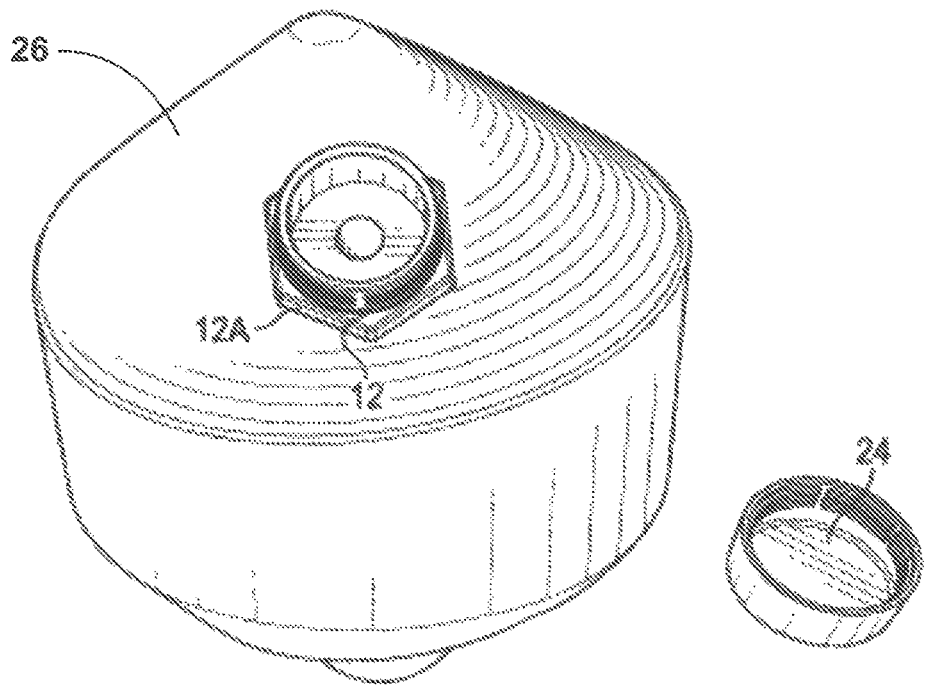
FIG. 6 is a front perspective view of the coconut water removal device with the lid off inserted into a coconut.
Figure 7:
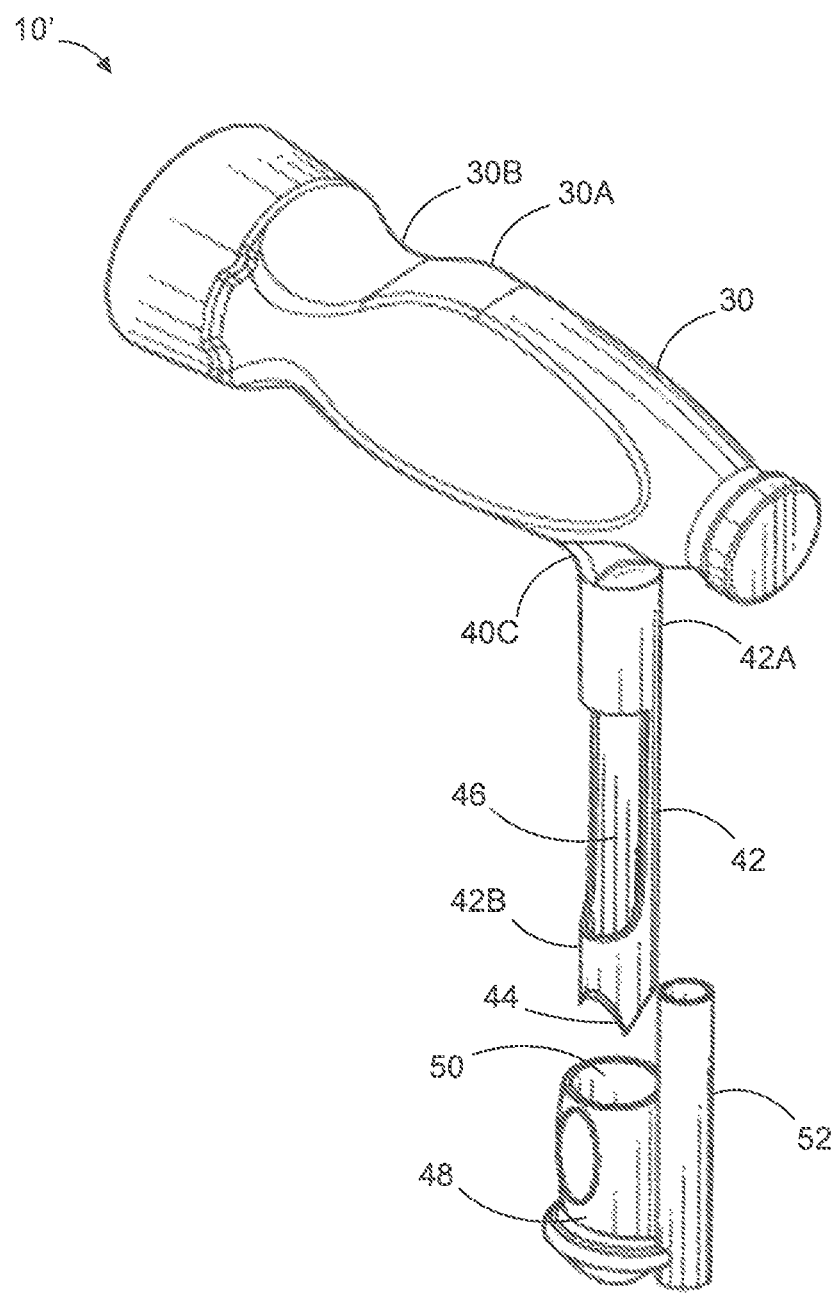
FIG. 7 is a perspective view of another embodiment of the coconut water removal device.
Figure 12:
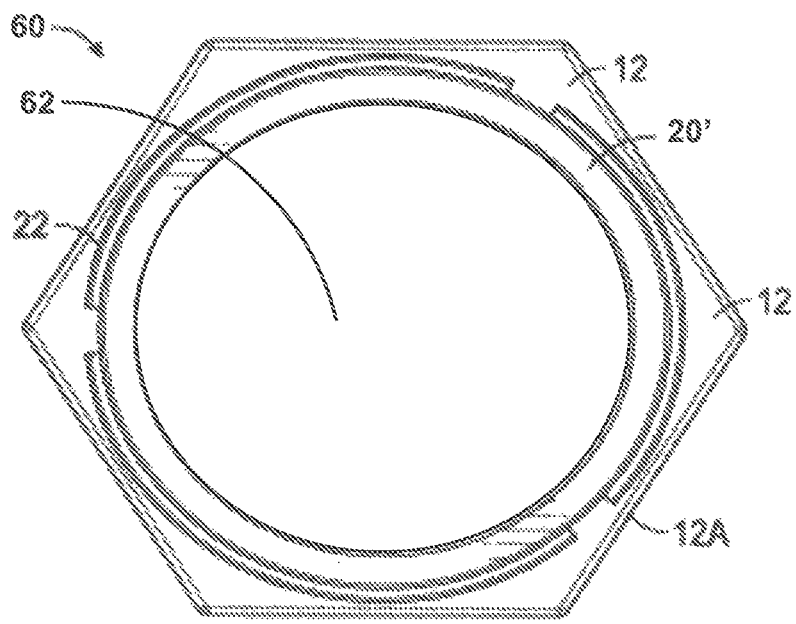
FIG. 12 is a top view of another embodiment of the coconut water removal device.
Figure 13:
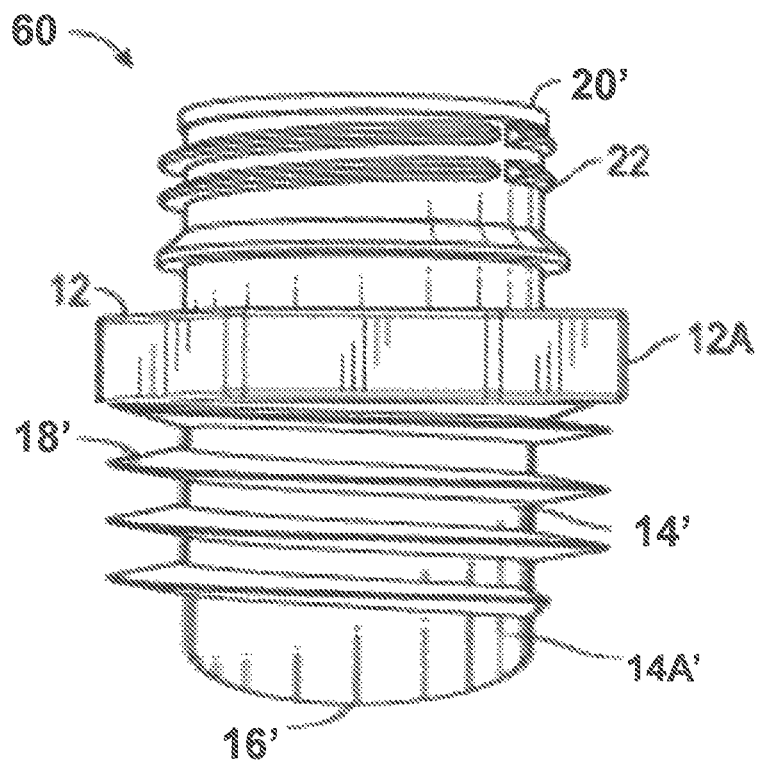
FIG. 13 is a front view of the coconut water removal device of FIG. 12.
Figure 14:
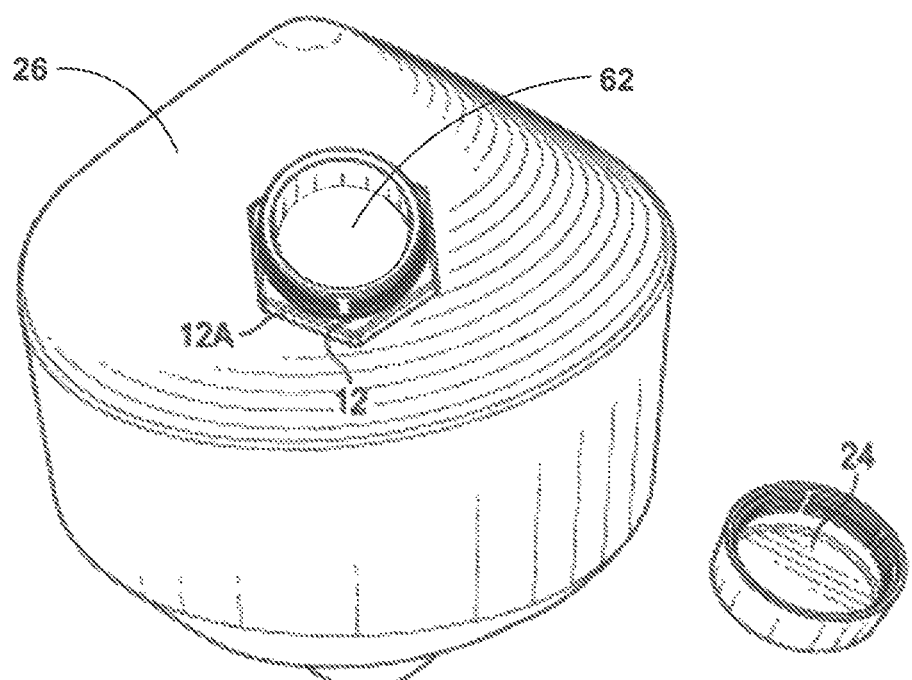
FIG. 14 is a side perspective view of the coconut water removal device of FIG. 12 with the lid on inserted into a coconut.

A tubular member 14' having a bore 62 may extend downward from a central area of the base member 12. A distal end 14A' of the tubular member 14' may be cut at an angle to form a pointed edge 16'. The pointed edge 16' may be configured to allow the device 60 to cut through the outer shell of the coconut and be inserted into the interior of the coconut. The tubular member 14' may have threading 18' formed around an exterior surface thereof. The threading 18' is a helical structure used to convert between rotational and linear movement or force. A wide mouth spout 20' with bore 62 may extend up from a top section of the base member 12. The wide mouth spout 20' may be in fluid communication with the tubular member 14'. Thus, a constant diameter pathway via the bore 62 may be formed from the wide mouth spout 20', through the base member 12 and through the tubular member 14'. The bore 62 may have a diameter that is adapted for insertion of a utensil through the device 60 for extracting the meat from the interior of a coconut. Thus, the wide mouth spout 20' may be used to pour out the coconut water from the interior of the coconut once the device 60 is inserted into the coconut. The wide mouth spout design 20' allows for more coconut water to flow through much quicker as compared to the narrower opening of the device 10 as best shown in FIGS. 3 and 4. Ribbing 22 may be formed around an outer surface of the spout 20. The ribbing 22 may be used to secure a lid 24 or closure device to the spout 20'.

Figure 2:
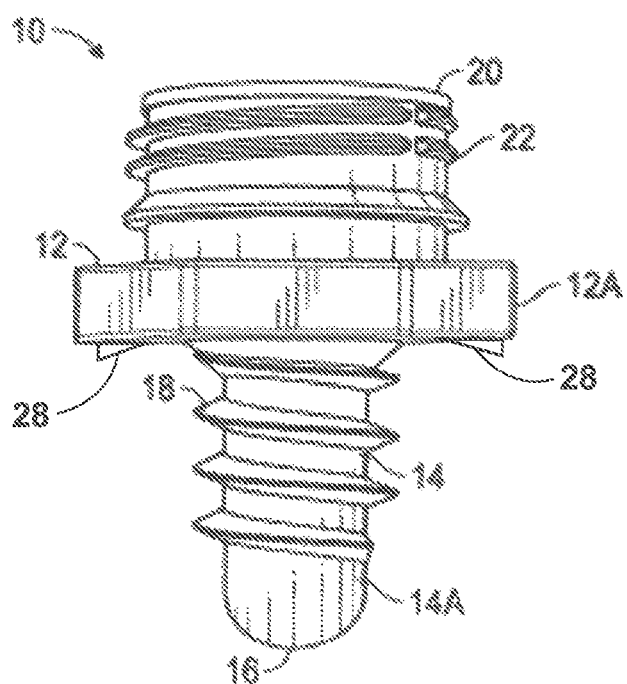
FIG. 2 is a front view of the coconut water removal device.

In use, a user of the device 60 may push the pointed edge 16 of the device 10 into the soft "eye" of the coconut. While it is easier to insert the device 10 into the "eye", it may be inserted into other areas of the coconut. A user may then use a wrench or similar tool to rotate the base member 12 thereby causing the threading 18' of the tubular member 14' to rotate into the coconut. The threading 18' can secure the device 60 to the coconut and further prevents leakage of the coconut water from the soft "eye" of the coconut where the device 60 was inserted. The ribbing 22 may form a set of threads that are reversible from the threading 18'. The opposing or reversible threading allows for tightening or unscrewing of the screw on lid 24 without unscrewing the device 60 from the coconut 26. In addition as best seen in FIG. 2, two or more spikes 28 may extend downward from the base member 12 in device (10, 60) that lock the device (10, 60) into the surface of the coconut.

Once the device 60 is inserted and tightened, the user may pour the coconut water out via the spout 20' or use the device 60 to drink the coconut water directly from the coconut. With access afforded by the wide mouth 20' the user may insert a utensil through the bore 62 to eat the meat from the walls of the coconut. The user may place the lid 24 on the device 60 and reseal the coconut if all the coconut water is not drunk.

The device (10, 60) may be made from 100% BPA-free food-grade polycarbonate suited for injection molding. The device may be manufactured with an additive that makes the device (10, 60) biodegradable in a landfill within five years.

In a specific embodiment the device (10, 60) may be formed of natural or plant based materials that are biodegradable. For example, corn meal may be compressed in a mold to form the device (10, 60). Plant based materials are marine safe and are naturally sustainable.

Figure 15:
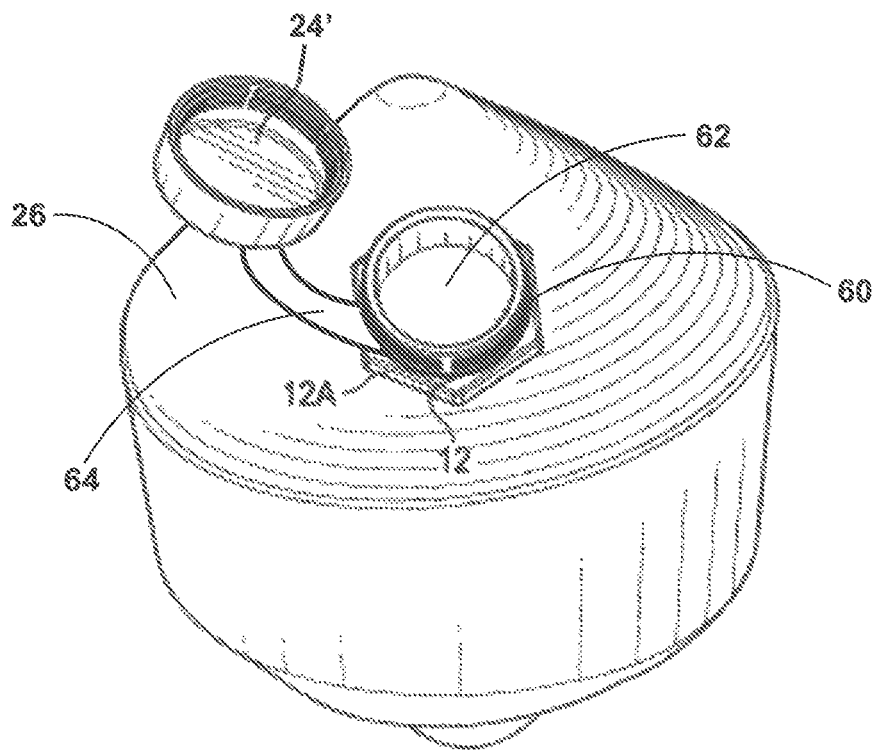
FIG. 15 is a front perspective view of the coconut water removal device of FIG. 12 with the lid off and tethered to the coconut water removal device inserted into a coconut.

FIG. 15 shows the device 60 tethered to the lid 24' via strap 64.

While embodiments of the disclosure have been described in terms of various specific embodiments, those skilled in the art will recognize that the embodiments of the disclosure may be practiced with modifications within the spirit and scope of the claims.

What is claimed is:

1. A device for draining coconut water from a coconut comprising:
    a base member having a plurality of flat surfaces formed around an outer perimeter in a screw nut configuration, wherein each of the plurality of flat surfaces formed around the outer perimeter are planer to one another and adjoining flat surfaces of the plurality of flat surfaces form equal angles around the outer perimeter to form the screw nut configuration, the screw nut configuration allowing a rotation force to be applied to the base member securing the device within the coconut;
    a tubular member attached to and extending downward from a central area of the base member, a distal end of the tubular member cut at an angle to form a pointed edge;
    a threading formed around an exterior surface of the tubular member, wherein the rotational force causing the threading to rotate in a coconut securing the device into the coconut and preventing leakage of the coconut;
    a spout extending up from a top section of the base member and in fluid communication with the tubular member, the spout having ribbing formed around an outer surface of the spout;
    a central bore with a constant diameter extending through the tubular member and the spout, the central bore defining an inner diameter of both the tubular member and the spout; and
    wherein the tubular member is cut at a single angle below the threading, the tubular member tapering to define a single bottom point at a distal end of the tubular member.

2. The device of claim 1, wherein the ribbing formed around the outer surface of the spout and the threading formed around the exterior surface of the tubular member are opposing or reversible threading.

3. The device of claim 1, comprising a lid positioned over the spout.

4. The device of claim 3, comprising a lid positioned over the spout and engaging the ribbing.

5. The device of claim 3, further comprising a strap that tethers the lid to the device.

6. The device of claim 1, wherein the plurality of flat surfaces are formed in a hex nut configuration around the outer perimeter.

7. The device of claim 1, wherein the plurality of flat surfaces are keyed to orient the device for automated placement with automated manufacturing equipment.

8. The device of claim 1, wherein the device is made from 100% BPA-free food-grade polycarbonate suited for injection molding.

9. The device of claim 1, wherein the device is made of natural or plant based materials that are biodegradable.

10. The device of claim 9, wherein the device is made of corn meal that is compressed in a mold to form the device.

11. The device of claim 1, wherein a plurality of spikes extend downward from the base member in the device that lock the device into an exterior surface of the coconut.

* * * * *